(12) United States Patent
Reinmuth et al.

(10) Patent No.: US 12,459,004 B2
(45) Date of Patent: Nov. 4, 2025

(54) MICROMECHANICAL COMPONENT FOR A SOUND TRANSDUCER AND CORRESPONDING PRODUCTION METHOD

(71) Applicant: Robert Bosch GmbH, Stuttgart (DE)

(72) Inventors: Jochen Reinmuth, Reutlingen (DE); Daniel Monteiro Diniz Reis, Esslingen am Neckar (DE); Martin Rambach, Pliezhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 975 days.

(21) Appl. No.: 17/471,548

(22) Filed: Sep. 10, 2021

(65) Prior Publication Data

US 2022/0080461 A1 Mar. 17, 2022

(30) Foreign Application Priority Data

Sep. 15, 2020 (DE) .......................... 102020211537.0

(51) Int. Cl.
*B06B 1/06* (2006.01)
*B06B 1/02* (2006.01)

(52) U.S. Cl.
CPC .......... *B06B 1/0666* (2013.01); *B06B 1/0207* (2013.01)

(58) Field of Classification Search
CPC ................................ B06B 1/06; B06B 1/0666
USPC ......................................... 310/322, 334, 335
See application file for complete search history.

(56) References Cited

U.S. PATENT DOCUMENTS

| | | | |
|---|---|---|---|
| 2007/0040477 A1* | 2/2007 | Sugiura ................. | B06B 1/0629 |
| | | | 310/324 |
| 2017/0210133 A1* | 7/2017 | Tsukahara .............. | H10N 30/06 |
| 2018/0107854 A1* | 4/2018 | Tsai ..................... | B81C 1/00238 |
| 2019/0290243 A1* | 9/2019 | Bryzek .................. | H01L 24/73 |

FOREIGN PATENT DOCUMENTS

WO  2016106153 A1  6/2016

\* cited by examiner

*Primary Examiner* — Derek J Rosenau
(74) *Attorney, Agent, or Firm* — NORTON ROSE FULBRIGHT US LLP

(57) ABSTRACT

A micromechanical component for a sound transducer device. The component includes a diaphragm element which includes a first diaphragm surface and a second diaphragm surface which points away from the first diaphragm surface, and at least one piezoelectric element situated on and/or at the first diaphragm surface. The micromechanical component includes a substrate having at least one control and/or evaluation circuit developed thereon and/or therein, the first diaphragm surface pointing toward the substrate, and the substrate is attached to the diaphragm element at least via at least one an electrically conductive bond connection structure which is developed on and/or at the first diaphragm surface, from which the second diaphragm surface is pointing away, and the at least one piezoelectric element is electrically connected to the at least one control and/or evaluation circuit at least via the at least one electrically conductive bond connection structure.

10 Claims, 8 Drawing Sheets

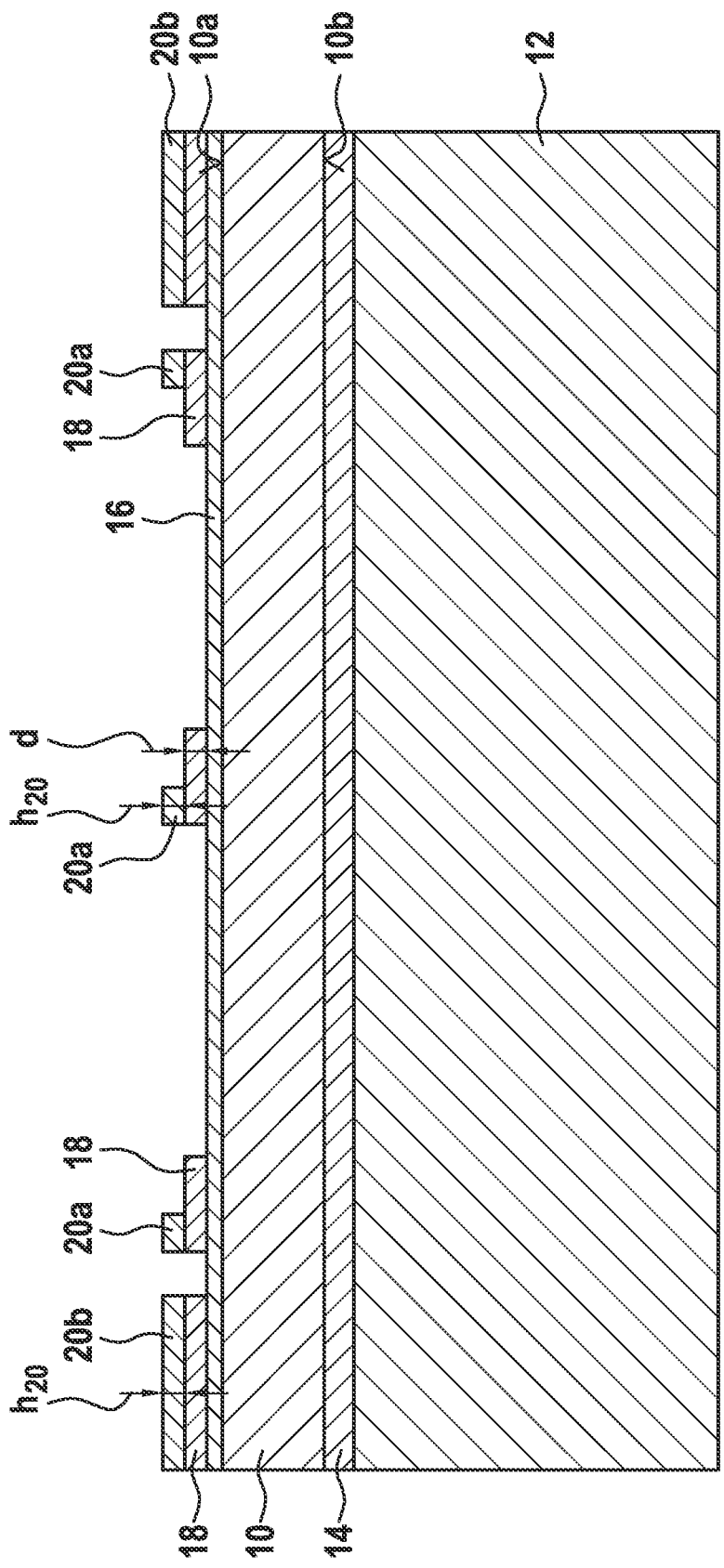

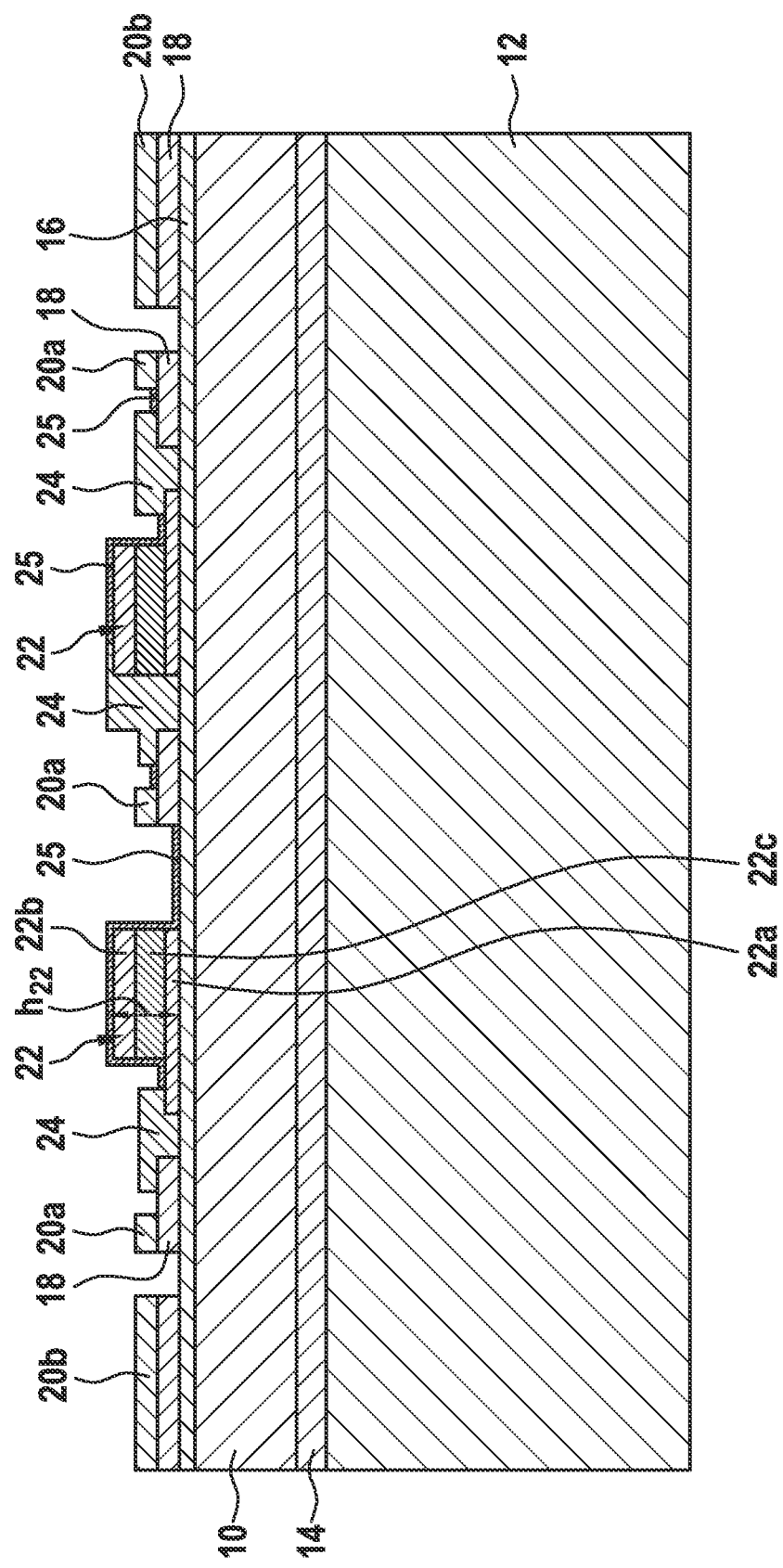

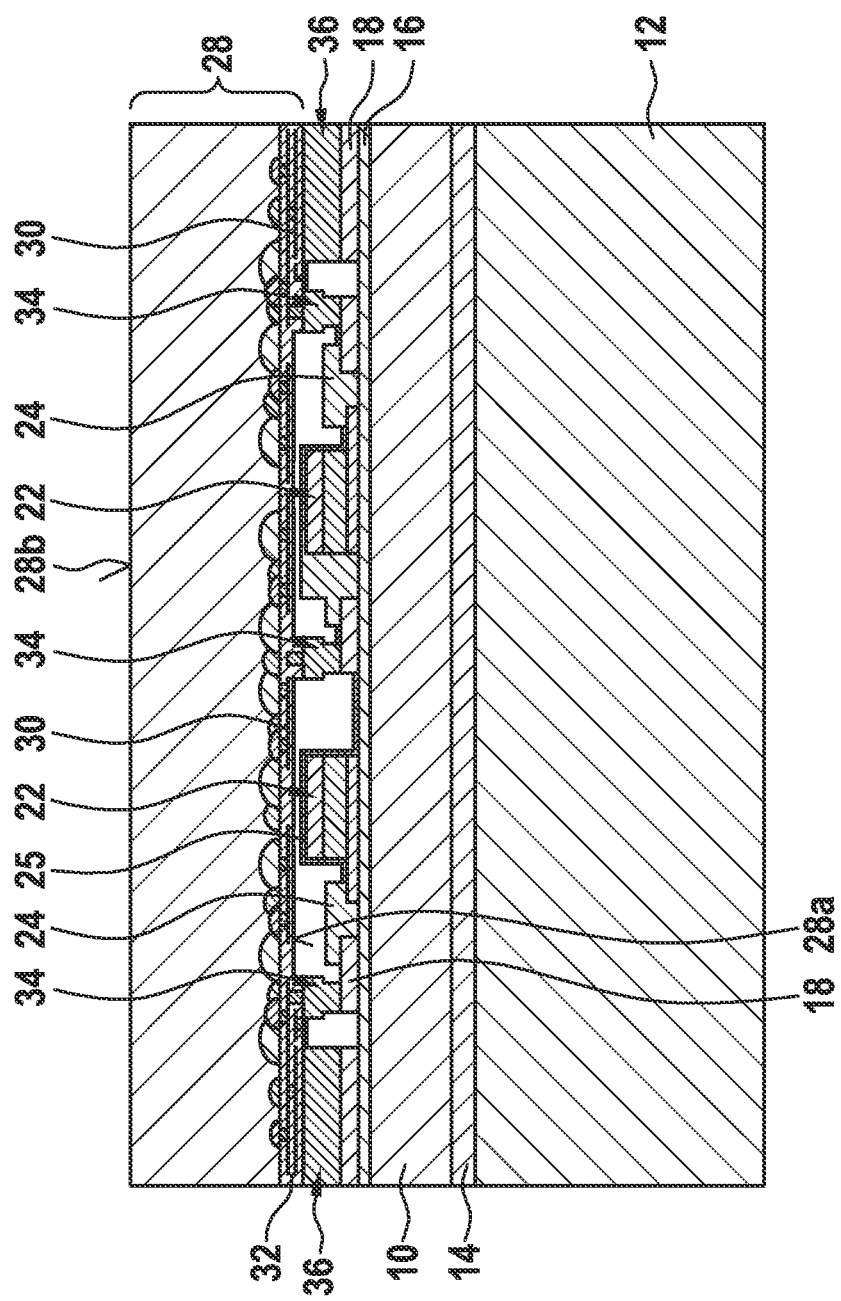

MICROMECHANICAL COMPONENT FOR A SOUND TRANSDUCER AND CORRESPONDING PRODUCTION METHOD

CROSS REFERENCE

The present application claims the benefit under 35 U.S.C. § 119 of German Patent Application No. DE 102020211537.0 filed on Sep. 15, 2020, which is expressly incorporated herein by reference in its entirety.

FIELD

The present invention relates to a micromechanical component for a sound transducer. In addition, the present invention relates to a production method for a micromechanical component for a sound transducer.

BACKGROUND INFORMATION

MEMS ultrasonic transducers are available in the related art such as the ultrasonic transducer which is described in PCT Patent Application No. WO 2016/106153 A1 and whose respective diaphragm is excited to oscillations with the aid of at least one piezoelectric element, and/or in which oscillations of their respective diaphragms are detected with the aid of the at least one piezoelectric element.

SUMMARY

The present invention provides a micromechanical component for a sound transducer and a production method for a micromechanical component for a sound transducer.

Example embodiment of the present invention provide micromechanical components which have a relatively simple design and may advantageously be used as sound transducers, as spatially resolved material detectors and/or as optical devices. In a micromechanical component according to an example embodiment of the present invention, its electrical connections between the at least one piezoelectric element situated on its diaphragm element and its at least one control and/or evaluation circuit are relatively well protected. This increases the possible use of the micromechanical component according to the present invention. In addition, the micromechanical components according to the present invention are able to be given a relatively small design at a relatively low production outlay. This particularly makes it easier to use the micromechanical components in the medical technology field. Furthermore, the micromechanical components according to example embodiments of the present invention are able to be produced using relatively cost-effective production processes and—as will be described in greater detail below—a high piezo coefficient of the at least one piezoelectric element of the produced micromechanical component is able to be ensured.

The statement that the at least one piezoelectric element is situated on and/or at the first diaphragm surface of the diaphragm element is meant to express that the at least one piezoelectric element is either in direct contact with the first diaphragm surface on the first diaphragm surface or is indirectly situated at the first diaphragm surface. The terms 'on' and 'at' should be interpreted accordingly in the further description.

In one advantageous embodiment of the micromechanical component of the present invention, the at least one electrically conductive bond connection structure is an aluminum-germanium bond connection structure. As will be described in greater detail below, the development of the at least one electrically conductive bond connection structure from aluminum and germanium allows the at least one piezoelectric element to be developed at a relatively high temperature of at least 400° C., which makes it possible to ensure a high piezo coefficient of the at least one piezoelectric element.

In a further advantageous embodiment of the micromechanical component, a reinforcement, gel-restriction and/or protection structure, which surrounds or spans at least a section of the second diaphragm surface, is attached on and/or at the second diaphragm surface of the diaphragm element. With the aid of the reinforcement, gel-restriction and/or protection structure, a pliability of the diaphragm is able to be selectively supported, and a dissolution of a gel that covers the subregion of the second diaphragm surface can be prevented and/or an affixation of the diaphragm including the attached substrate in a receiving opening of a housing or a holding mechanism is able to be made easier.

The substrate preferably has at least one through-contact, which extends from an inner surface of the substrate pointing toward the diaphragm element to a countersurface of the substrate pointing away from the inner surface. The thereby achievable vertically stacked system/development of the micromechanical component is able to be used for a laterally particularly small design.

The countersurface of the substrate may optimally be soldered to a circuit board. This facilitates an attachment of the substrate including the diaphragm element fixed in place thereon to the respective circuit board.

In a further advantageous embodiment of the present invention, a maximum distance between the at least one control and/or evaluation circuit and the inner surface of the substrate pointing toward the diaphragm element is smaller than a minimum distance between the at least one control and/or evaluation circuit and the countersurface of the substrate pointing away from the inner surface. Such a positioning/development of the at least one control and/or evaluation circuit on or in the substrate offers better protection from environmental effects.

During the execution of the production method, the at least one electrically conductive bond connection structure is preferably produced with the aid of a eutectic bonding method. In this way, the at least one electrically conductive bond connection structure is able to be produced in a relatively uncomplicated manner.

In order to carry out the eutectic bonding method, prior to positioning the at least one piezoelectric element on and/or at the first diaphragm surface, germanium is preferably deposited on and/or at the first diaphragm surface, and the at least one piezoelectric element is positioned on and/or at the first diaphragm surface at a temperature that is greater than or equal to 400° C. only after germanium has been deposited on and/or at the first diaphragm surface. In addition, in order to carry out the eutectic bonding method, aluminum is deposited on and/or at an inner surface of the substrate that will later be pointing toward the diaphragm element, and then the at least one electrically conductive bond connection structure is formed out of the germanium deposited on and/or at the first diaphragm surface and from the aluminum deposited on and/or at the inner surface of the substrate. The described eutectic bonding method makes it possible to position the at least one piezoelectric element on and/or at the diaphragm surface at a relatively high temperature without having to fear that the germanium used for the eutectic bonding method will melt. Due to its production at the relatively high temperature, the at least one piezoelectric element is therefore able to be developed with an advantageously high piezo coefficient.

In a further advantageous embodiment of the production method of the present invention, the at least one piezoelectric element is positioned on and/or at the first diaphragm surface of a diaphragm element that is attached to a carrier substrate and abuts an etch-stop layer of the carrier substrate, and after the substrate has been attached to the diaphragm element, the carrier substrate is at least partially etched off with the aid of an etching method that is carried out up to the etch-stop layer. In an example embodiment of the production method described here, the carrier substrate may thus be used as a "mechanical support" of the diaphragm element. This facilitates a relatively thin/thin-layered development of the diaphragm element.

In an advantageous manner, a reinforcement, gel-restriction and/or protection structure, which is fixed in place on and/or at the second diaphragm surface of the diaphragm element and surrounds or spans at least a subregion of the second diaphragm surface, is able to be structured out of the carrier substrate when the carrier substrate is etched. As a result, the above-described advantages of the reinforcement, gel-restriction and/or protection structure are able to be exploited without its/their production requiring any (real) additional effort or expense.

In addition, the diaphragm element together with the attached substrate is able to be introduced into a receiving opening of a housing in such a way that a sealing ring which is at least partially situated in a groove formed on the receiving opening makes contact with the reinforcement, gel-restriction and/or protection structure. An undesired entry of particles or fluids into the receiving opening will therefore be reliably prevented.

The afore-described features of embodiments of the micromechanical component of the present invention may also be brought about accordingly by a corresponding development of the production method. In the same way, the afore-described features of embodiments of the production method may be developed on a corresponding embodiment of the micromechanical component.

BRIEF DESCRIPTION OF THE DRAWINGS

Additional features and advantages of the present invention will be described below with the aid of the figures.

FIGS. 1a to 1f show schematic representations of intermediate products in order to describe an example embodiment of the production method for a micromechanical component for a sound transducer, in accordance with the present invention.

DETAILED DESCRIPTION OF EXAMPLE EMBODIMENTS

Figure 1C:
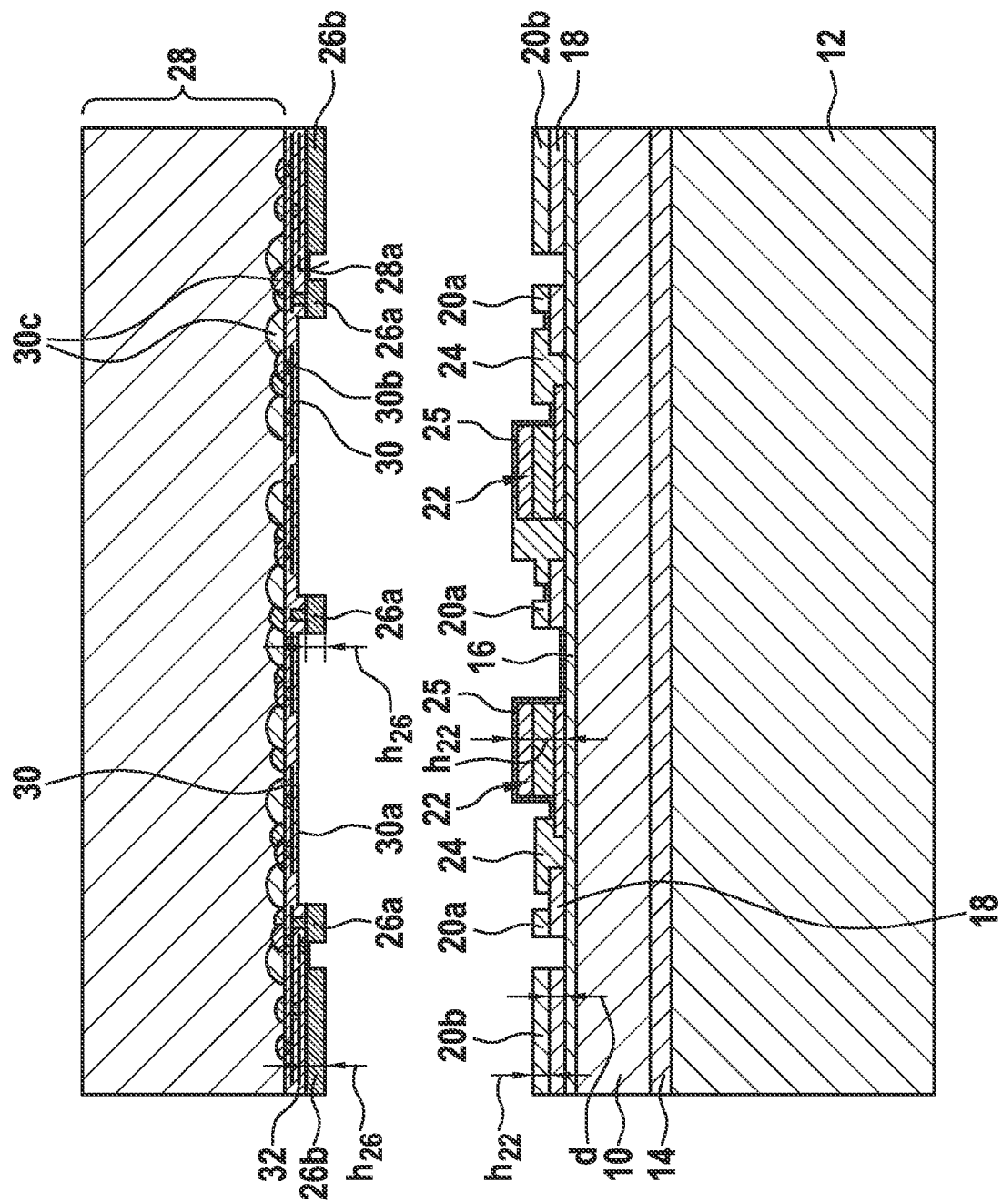
Figure 1E:
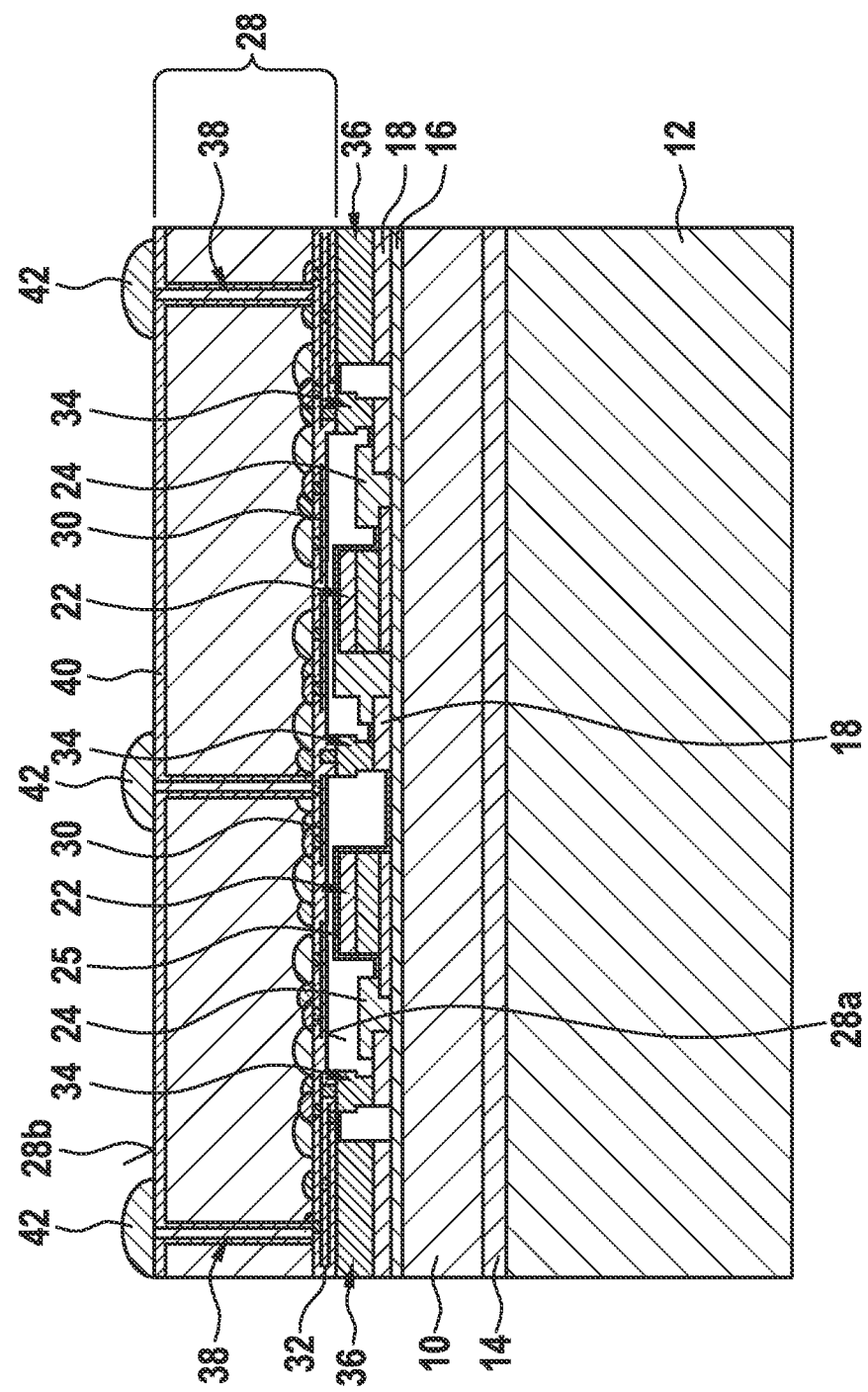

FIGS. 1a to 1f show schematic representations of intermediate products in order to describe an example embodiment of the production method for a micromechanical component for a sound transducer.

When the production method described in the following text is carried out, at least one piezoelectric element (not shown in FIG. 1a) is positioned on and/or at a first diaphragm surface 10a of a diaphragm element 10 of the later micromechanical component in such a way that a second diaphragm surface 10b pointing away from the first diaphragm surface 10a points away from the at least one piezoelectric element. For example, diaphragm element 10 may be or may include a layer of a semiconductor material such as a layer of silicon, in particular. However, diaphragm element 10 may also be understood to be a multi-layer diaphragm element.

Preferably, a layer thickness of the diaphragm element aligned perpendicular to first diaphragm surface 10a and/or perpendicular to second diaphragm surface 10b may be smaller than or equal to 20 µm. However, in order to still ensure excellent stability of the diaphragm element in the course of the production method, the at least one piezoelectric element in the embodiment described here is positioned on and/or at first diaphragm surface 10a of a diaphragm element that is attached on a carrier substrate 12 and abuts an etch-stop layer 14 of carrier substrate 12. In this case, first diaphragm surface 10a of diaphragm element 10 denotes a boundary surface of diaphragm element 10 pointing away from carrier substrate 12, while second diaphragm surface 10b of diaphragm element 10 abuts etch-stop layer 14. Carrier substrate 12, for instance, may be a semiconductor substrate, in particular a silicon substrate. Carrier substrate 12 preferably has a thickness of at least 250 µm. Etch-stop layer 14 can be a silicon dioxide layer 14, for instance. Thus, a SOI substrate (silicon on insulator substrate) is also able to be used as a starting material for a layer stack, which includes carrier substrate 12, etch-stop layer 14 and diaphragm element 10.

Optionally, first diaphragm surface 10a is at least partially covered by an insulation layer 16 such as a silicon dioxide layer 16. Then, at least one circuit trace 18, preferably of doped polysilicon, is able to be formed on a side of insulation layer 16 that points away from diaphragm element 10. A layer thickness d of the at least one circuit trace 18 aligned perpendicular to first diaphragm surface 10a may be smaller than or equal to 5 µm.

In addition, in the production method described here, a substrate of the later micromechanical component, which has at least one control and/or evaluation circuit formed thereon and/or therein, is attached to diaphragm element 10 in a method step to be described at a later point. The attachment of the substrate to diaphragm element 10 is accomplished by way of at least one electrically conductive bond connection structure, which is preferably developed using a eutectic bonding method. In the embodiment described here, the eutectic bonding method is carried out in a plurality of partial steps, of which a first partial step is schematically illustrated in FIG. 1a. As a first partial step, at least one bonding material region 20a and 20b of germanium is deposited on and/or at first diaphragm surface 10a. With the aid of the position and form of the at least one bonding material region 20a of germanium, a respective position and partial form of the at least one subsequently electrically conductive bond connection structure on and/or at the first diaphragm surface 10a is established. Since in the production method described here as an advantageous further refinement, the eutectic bonding method is also used to form a bond frame that surrounds the electrically conductive bond connection structures (used as electrical connections), a respective position and partial form of the later bond frame on and/or at the first diaphragm surface 10a is also established with the aid of the position and form of at least one (further) bond material region 20b of germanium. An intermediate product obtained in this way is shown in FIG. 1a.

The at least one bonding material region 20a and 20b of germanium thus forms a first bond interface for the later completed eutectic bonding method. The at least one bonding material region 20a and 20b of germanium preferably covers at least one circuit trace 18 at least partially. Optionally, it is also possible to introduce at least one further layer between the at least one circuit trace 18 and the respective covering bonding material region 20a and 20b. A height $h_{20}$ of the at least one bonding material region 20a and 20b of germanium aligned perpendicular to first diaphragm surface 10a is furthermore able to be selected relatively freely.

It is expressly pointed out that in the embodiment of the production method described here the at least one bonding material region 20a and 20b of germanium is deposited prior to positioning/developing the at least one piezoelectric element 22 on and/or at first diaphragm surface 10a. For this reason, the positioning/development of the at least one piezoelectric element 22 on and/or at first diaphragm surface 10a is schematically first illustrated in FIG. 1b. The at least one piezoelectric element 22 is positioned/developed on and/or at first diaphragm surface 10a in such a way that in a later operation of the finished micromechanical component, diaphragm element 10 is deformable/deformed with the aid of the at least one piezoelectric element 22, and/or a deformation of diaphragm element 10 induces a voltage change in the at least one piezoelectric element 22. The at least one piezoelectric element 22 is preferably positioned/developed on and/or at first diaphragm surface 10a in such a way that diaphragm element 10 is able to be induced or is induced to oscillations with the aid of the at least one piezoelectric element 22, and/or oscillations of diaphragm element 10 are able to be converted or are converted into voltage signals with the aid of the at least one piezoelectric element 22. This makes it possible to use the finished micromechanical component for a wide range of purposes.

In the embodiment of the production method described here, (after germanium has been deposited on and/or at first diaphragm surface 10a), the at least one piezoelectric element 22 is furthermore positioned/developed on and/or at first diaphragm surface 10a at a temperature that is greater than or equal to 400° C. This is possible because both the at least one circuit trace 18 of doped polysilicon and the at least one bonding material region 20a and 20b of germanium are not damaged or destroyed at such a high temperature. As a result, it is possible to produce the at least one piezoelectric element 22 at a temperature that is so high that a very high piezo coefficient of the at least one piezoelectric element 22 is able to be induced.

For example, a piezo layer stack 22 as the at least one piezoelectric element 22 may be deposited on insulation layer 16 and structured. Such a piezo layer stack 22 can have a first electrode 22a and a second electrode 22b in each case and at least one piezoelectric material 22c which is inserted between its first electrode 22a and its second electrode 22b. Lead-zirconate titanate (PZT) or potassium-sodium-niobate (KNN or $(K,Na)NbO_3$) is preferably used as the at least one piezoelectric material 22c. Optionally, a still further layer such as a lanthanum-nickel oxide layer ($LaNiO_3$) is additionally able to be formed between first electrode 22a and piezoelectric material 22c in order to facilitate the formation/deposition of the at least one piezoelectric material 22c.

If desired, in order to protect the at least one piezoelectric element 22 from environmental influences, the at least one piezoelectric element 22 is also able to be encapsulated in a protective layer 25 such as a tantalum-nitride layer, a silicon nitride layer and/or an aluminum-oxide layer. However, it is pointed out that protective layer 25 can usually be dispensed with when the described production method is executed because the at least one piezoelectric element 22 is already well protected from environmental influences by the circumferential bond frame described further below.

In addition, a height $h_{22}$ of the at least one piezoelectric element 22 aligned perpendicular to first diaphragm surface 10a is able to be selected relatively freely. As the following explanations will reveal, the circumferential bond frame 36 described below already reliably protects the at least one piezoelectric element 22 from environmental influences even at a relatively great height $h_{22}$ of the at least one piezoelectric element 22.

Optionally, at least one further circuit trace 24 by which the at least one piezoelectric element 22 is electrically connected to the at least one circuit trace 18 is subsequently able to be formed. The at least one further circuit trace 24 can easily be made of aluminum because once the at least one piezoelectric element 22 has been produced, the rest of the production method described in the further text is able to be carried out at a relatively low temperature. FIG. 1b shows the intermediate product after the at least one further circuit trace 24 has been formed.

FIG. 1c shows a second partial step for carrying out the eutectic bonding method, the second partial step being able to be executed prior to or following the afore-described first partial step. As a second partial step of the eutectic bonding method, at least one bonding material region 26a and 26b of aluminum is deposited on and/or at an inner surface 28a of substrate 28, later pointing toward diaphragm element 10, with the at least one control and/or evaluation circuit 30 developed thereon or therein. With the aid of the position and form of the at least one bonding material region 26a of aluminum, a respective position and partial form of the at least one subsequently electrically conductive bonding connection structure is established on and/or at inner surface 28a of substrate 28. Since the surrounding bond frame is also formed by the eutectic bonding method in the production method described here, a respective position and partial form of the later bond frame on inner surface 28a of substrate 28 is likewise established by the position and form of at least one (further) bonding material region 26b of aluminum.

The at least one bonding material region 26a and 26b of aluminum serves as a second bond interface of the eutectic bonding method concluded later. The at least one bonding material region 26a and 26b of aluminum is able to be deposited and structured on inner surface 28a of substrate 28 using a standard process of semiconductor technology. In addition, a height $h_{26}$ of the at least one bonding material region 26a and 26b of aluminum aligned perpendicular to inner surface 28a of substrate 28 is easily specifiable in such a way that a sum of layer thickness d of the at least one circuit trace 18, height $h_{20}$ of the at least one bonding material region 20a and 20b of germanium, and height $h_{26}$ of the at least one bonding material region 26a and 26b of aluminum is greater than height $h_{22}$ of the at least one piezoelectric element 22. In this way, framing of relatively high piezoelectric elements 22 with the aid of the circumferential bonding frame is therefore possible as well.

As may be gathered from FIG. 1c, the at least one control and/or evaluation circuit 30 may include at least one contact layer 30a embedded in an insulation layer 32, at least one through-contact 30b embedded in insulation layer 32, and at least one doped subregion 30c of substrate 28 that abuts insulation layer 32. Because methods for producing the at least one control and/or evaluation circuit 30 on and/or in substrate 28 are conventional in the related art, no further description will be provided here.

FIG. 1d shows the final partial step of the eutectic bonding method by which the at least one electrically conductive connection structure 34 of the germanium deposited on and/or at first diaphragm surface 10a and the aluminum deposited on and/or at inner surface 28a of substrate 28 or of bonding material regions 20a and 26a is formed. As can also be gathered from FIG. 1d, substrate 28 is attached to diaphragm element 10 by forming the at least one electrically conductive bond connection structure 34 in such a way that first diaphragm surface 10a is pointing toward substrate 28 and second diaphragm surface 10b is pointing away from substrate 28. In addition, by attaching substrate 28 to diaphragm element 10 at least via the at least one electrically conductive bond connection structure 34 formed on and/or at first diaphragm surface 10a, second diaphragm surface 10b is pointing away from the at least one electrically conductive bond connection structure 34. Moreover, by attaching substrate 28 to diaphragm element 10 with the aid of the at least one electrically conductive bond connection structure 34, the at least one piezoelectric element 22 is electrically connected to the at least one control and/or evaluation circuit 30 at least via the at least one electrically conductive bond connection structure 34.

As may be gathered from FIG. 1d, the production method described here makes it possible to contact the at least one piezoelectric element 22 via the bond interface by the development of the at least one electrically conductive bond connection structure 34. A number of possible electrical connections between the at least one piezoelectric element 22 and the at least one control and/or evaluation circuit 30 thereby scales with a square of a minimum of a diameter of diaphragm element 10 aligned in parallel with first diaphragm surface 10a and a diameter of substrate 28 aligned in parallel with inner surface 28a. The described production method thus allows for the development of a relatively high number of electrical connections as electrically conductive bond connection structures 34 in comparison with the minimum of the diameter of diaphragm element 10 and the diameter of substrate 28. This may be exploited for increasing the number of electrical connections and for reducing the diameter of diaphragm element 10 and substrate 28. As a consequence, the described production method makes it easier to miniaturize the micromechanical component produced in this manner. Nevertheless, the micromechanical component produced with the aid of the production method described here has a relatively simple design.

As can also be gathered from the intermediate product of FIG. 1d, all electrically conductive bond connection structures 34 used as electrical connections in the micromechanical component are able to be efficiently protected in a relatively simple manner with the aid of a bond frame 36 that surrounds them. The (additional) bonding material regions 20b and 26b of germanium or aluminum may be used to produce circumferential bond frame 36. As a result, no additional method steps are required for producing circumferential bond frame 36.

After substrate 28 has been attached to diaphragm element 10, substrate 28 is optionally able to be thinned starting from a countersurface 28b that points away from its inner surface 28a. The intermediate product is shown in FIG. 1d.

If desired, at least one through-contact 38 through substrate 28 may then be formed, which extends from inner surface 28a of substrate 28 pointing toward diaphragm element 10 to countersurface 28b of substrate 28 pointing away from inner surface 28a. Optionally, the at least one through-contact 38 may also extend through an insulation layer 40 deposited on countersurface 28b. Countersurface 28b of substrate 28 is able to be soldered to a circuit board (not shown). To this end, at least one solder ball 42, for example, may be attached to the at least one through-contact 38 on the side of substrate 28 pointing away from diaphragm element 10. The side of substrate 28 pointing away from diaphragm element 10 may thus be embodied as a rewiring plane, which allows for a more flexible positioning of substrate 28 together with attached diaphragm element 10 on the circuit board, and for positioning substrate 28 with the aid of a flip-chip process, in particular.

Figure 1F:
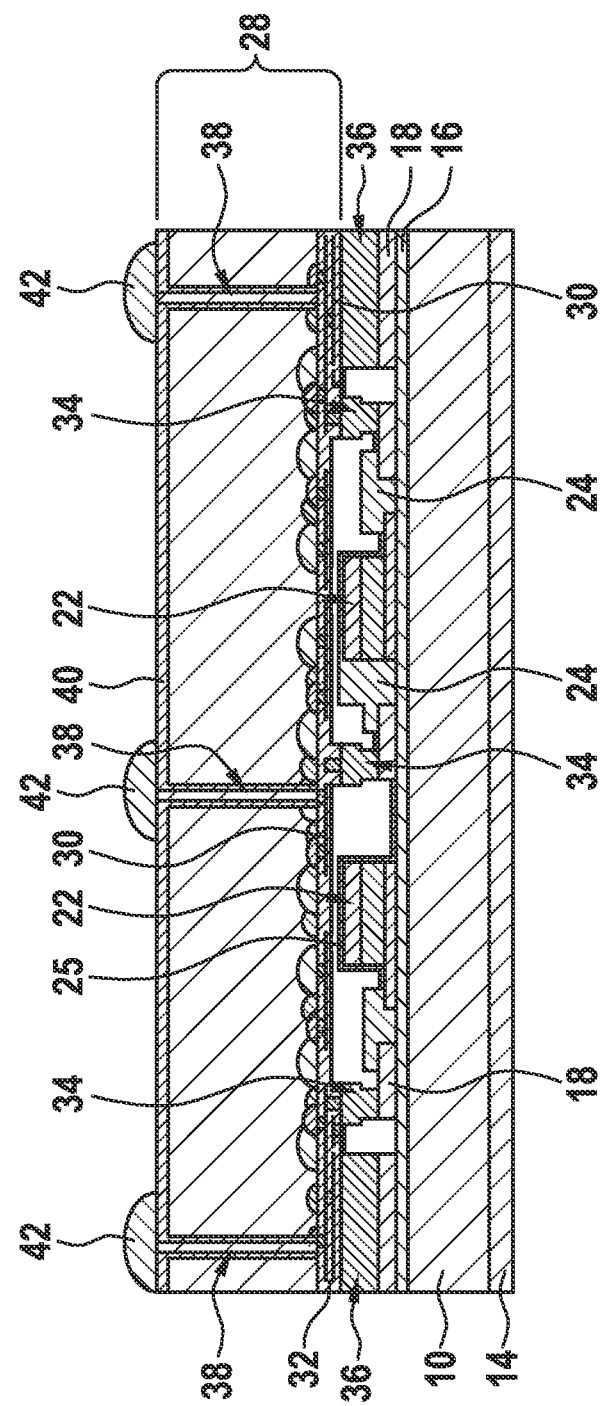

As a last, optional, method step of the production method, FIG. 1f shows an at least partial removal of carrier substrate 12 in that carrier substrate 12 is at least partially etched off by an etching method that is carried out up to etch-stop layer 14 after substrate 28 has been attached to diaphragm element 10. A very well defined and uniform thickness of diaphragm element 10 is able to be produced or maintained in this way. In the example of FIG. 1f, carrier substrate 12 is removed in its entirety. If desired, etch-stop layer 14 may then be removed as well. As an alternative, however, a reinforcement, gel-restriction and/or protection structure, which is fixed in place on and/or at second diaphragm surface 10b of diaphragm element 10 and surrounds or spans at least a subregion of second diaphragm surface 10b, is able to be patterned out of carrier substrate 12 when carrier substrate 12 is etched. Advantageous possible uses for the reinforcement, gel-restriction and/or protection layer are going to be discussed later in the text.

Figure 2:
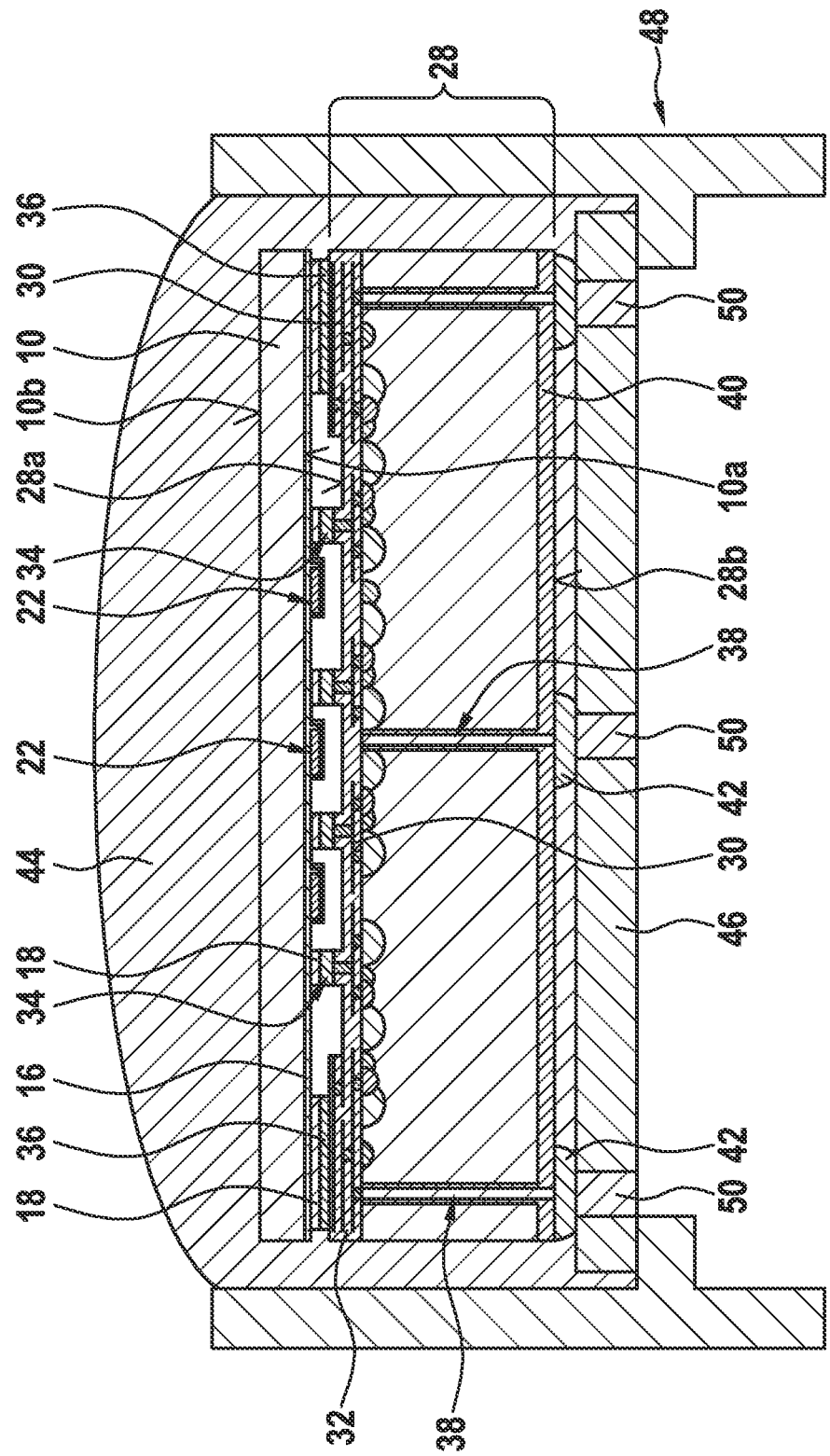
FIG. 2 shows a schematic representation of a first example embodiment of the micromechanical component of the present invention.

FIG. 2 shows a schematic illustration of a first embodiment of the micromechanical component.

The micromechanical component schematically illustrated in FIG. 2 has a diaphragm element 10 which includes a first diaphragm surface 10a and a second diaphragm surface 10b that points away from first diaphragm surface 10a. At least one piezoelectric element 22, from which second diaphragm surface 10b is pointing away, is situated on and/or at first diaphragm surface 10a. The at least one piezoelectric element 22 is positioned/developed on and/or at first diaphragm surface 10a in such a way that diaphragm element 10 is able to be deformed/is deformed with the aid of the at least one piezoelectric element 22, and/or a deformation of diaphragm element 10 induces a voltage change in the at least one piezoelectric element 22. The at least one piezoelectric element 22 is preferably positioned/developed on and/or at first diaphragm surface 10a in such a way that diaphragm element 10 is able to be set/is set into oscillations with the aid of the at least one piezoelectric element 22, and/or in such a way that oscillations of diaphragm element 10 are able to be converted/are converted into voltage signals with the aid of the at least one piezoelectric element 22.

In addition, the micromechanical component includes a substrate 28 having at least one control and evaluation circuit 30 formed thereon and/or therein. While first diaphragm surface 10a is pointing toward substrate 28, second diaphragm surface 10b is pointing away from substrate 28. At the same time, substrate 28 is attached to diaphragm element 10 at least via at least one electrically conductive bond connection structure 34 which is developed on and/or at first diaphragm surface 10a and from which second diaphragm surface 10b points away. Furthermore, the at least one piezoelectric element 22 is electrically connected to the at least one control and evaluation circuit 30 at least via the at least one conductive bond connection structure 34.

In the micromechanical component of FIG. 2, second diaphragm surface 10b of diaphragm element 10 may thus be used as an actuator and/or sensor surface of diaphragm element 10, while the at least one piezoelectric element 22 and the at least one electrically conductive bond connection structure 34 used as an electrical connection are protected during such use of second diaphragm surface 10b on account of their placement "pointing away from" second diaphragm surface 10b. As a result, second diaphragm surface 10b of diaphragm element 10 as an actuator and/or sensor surface of diaphragm element 10 may be readily exposed to environmental influences without negative effects on the at least one piezoelectric element 22 or the at least one electrically conductive bond connection structure 34. As a consequence, barely any damage to the at least one piezoelectric element 22 or the at least one electrically conductive bond connection structure 34 used as an electrical connection has to be expected while the micromechanical component is in operation. Instead, surrounding bond frame 36 reliably protects the at least one piezoelectric element 22 and the at least one electrically conductive bond connection structure 34 used as an electrical connection from environmental influences such as from a gel 44 that at least partially surrounds the micromechanical component.

In addition, a maximum distance between the at least one control and/or evaluation circuit 30 and inner surface 28a of substrate in the micromechanical component of FIG. 2 is smaller than a minimum distance between the at least one control and/or evaluation circuit 30 and countersurface 28b of substrate 28 pointing away from inner surface 28a. As a consequence, the at least one control and/or evaluation circuit 30 is well protected from environmental influences as well.

As has become clear from the preceding description, the micromechanical component of FIG. 2 may also be produced with the aid of the afore-described, easily executed production process. Since the production of the at least one piezoelectric element 22 takes place at a relatively high temperature when this production method is executed, the at least one piezoelectric element 22 is able to be developed with an advantageously high piezo coefficient. This allows the micromechanical component to be used as a sensor and/or actuator device in a wide range of applications.

As an optional refinement, substrate 28 of the micromechanical component of FIG. 2 also has at least one through-contact 38, which extends from an inner surface 28a of substrate 28 pointing toward diaphragm 10 to a countersurface 28b of substrate 28 pointing away from inner surface 28a. In addition, countersurface 28b of substrate 28 is able to be soldered to a circuit board 46, e.g., in that at least one solder ball 42 is attached to the at least one through-contact 38 on a side of substrate 28 that points away from diaphragm element 10. Circuit board 46 can be part of a housing 48 and/or be developed with at least one further through-contact 50.

With regard to further properties and features of the micromechanical component of FIG. 2, reference is made to the features described with the aid the previously discussed production method.

Figure 3:
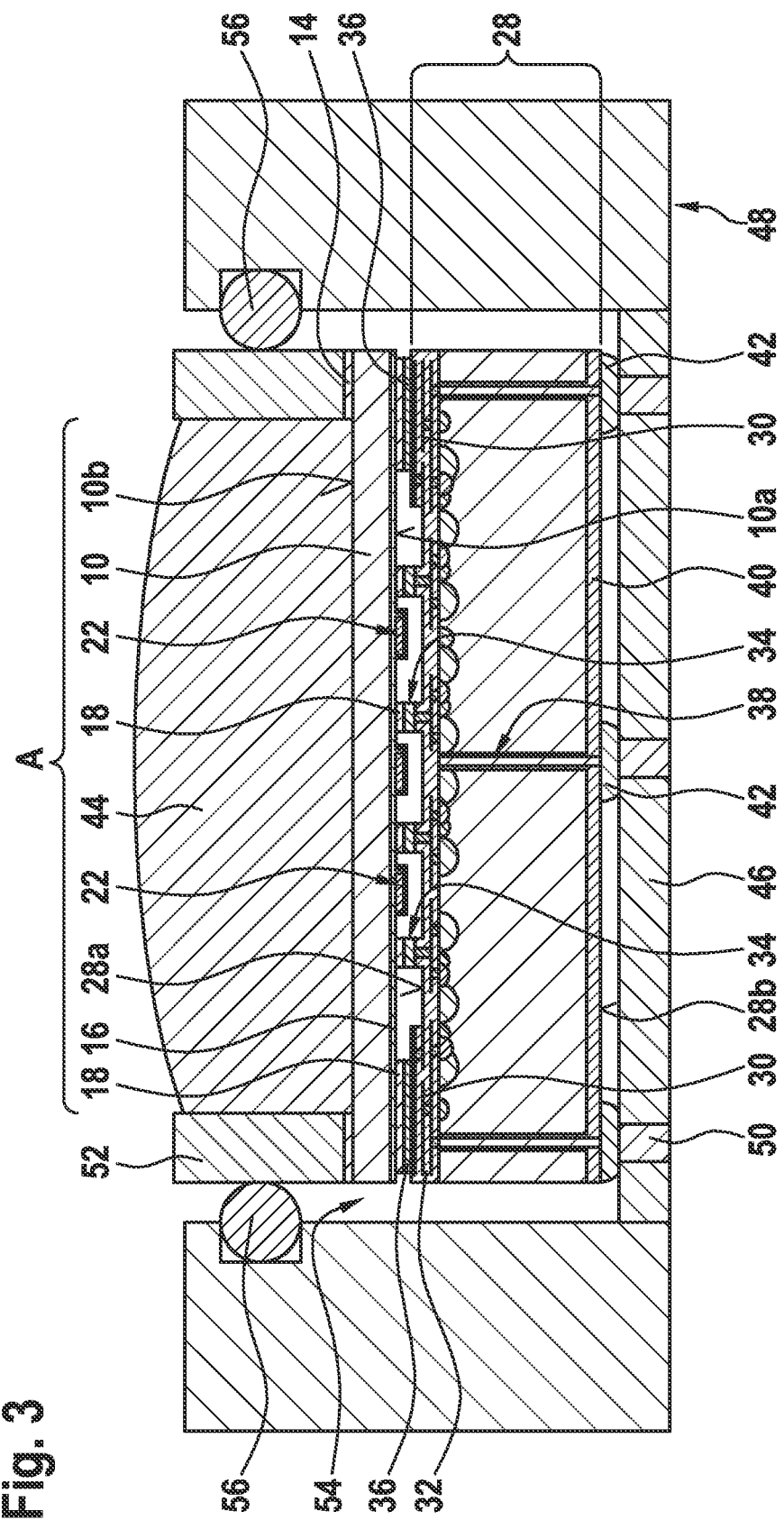
FIG. 3 shows a schematic representation of a second example embodiment of the micromechanical component of the present invention.

FIG. 3 shows a schematic illustration of a second embodiment of the micromechanical component.

As a supplementation, the micromechanical component of FIG. 3 also includes a reinforcement, gel-restriction and/or protection structure 52 that is fixed in place on and/or at second diaphragm surface 10b of diaphragm element 10 and frames or spans at least a subregion A of second diaphragm surface 10b. As may be gathered from FIG. 3, leakage of gel 44, for instance, is able to be prevented with the aid of reinforcement, gel-restriction and/or protection structure 52. Alternatively or additionally, diaphragm element 10 together with attached substrate 28 may be introduced into a receiving opening 54 of housing 48 in such a way that a sealing ring 56 which is at least partially situated in a groove developed on receiving opening 54 is in contact with reinforcement, gel-restriction and/or protection structure 52. A seepage of fluids into receiving opening 54 is therefore reliably preventable with the aid of sealing ring 56.

With regard to further features and advantages of the micromechanical component of FIG. 3, reference is made to the previously described embodiments.

The afore-described micromechanical components, for example, may advantageously be used as (at least part of) a sound transducer such as an ultrasonic transducer, in particular. More specifically, the micromechanical components are able to be used in a variety of ways as MEMS ultrasonic transducers and/or as PMUT (piezoelectric micromachines ultrasonic transducers). In the same way, the afore-described micromechanical components are also able to be used as (at least part of) a spatially resolved material detector or detectors. The afore-described micromechanical components are also suitable for (at least part of an) optical device such as an optical mirror device or an interferometer, in particular.

Second diaphragm surface 10b of diaphragm element 10 used as an actuator and/or sensor surface of diaphragm element 10 may also be referred to as an ultrasonic head of the respective micromechanical component. It is expressly pointed out that an extension of the afore-described micromechanical components aligned in parallel with second diaphragm surface 10b of diaphragm element 10 may be relatively small despite a relatively high number of electrical connections between piezoelectrical elements 22 and control and/or evaluation circuits 30. This is also known as a miniaturization of an ultrasonic head of the micromechanical component. For that reason, the afore-described micromechanical components may be used for a variety of purposes, in particular also in the field of medical technology.

All previously described micromechanical components are also able to be combined very flexibly with virtually any application-specific integrated circuit (ASIC).

What is claimed is:

1. A micromechanical component for a sound transducer, comprising:
    a diaphragm element having a first diaphragm surface and a second diaphragm surface that points away from the first diaphragm surface;
    at least one piezoelectric element situated on and/or at the first diaphragm surface, from which the second diaphragm surface points away;
    a substrate having at least one control and/or evaluation circuit developed thereon and/or therein, the first diaphragm surface pointing toward the substrate and the second diaphragm surface pointing away from the substrate, the substrate being attached to the diaphragm element at least via at least one an electrically conductive bond connection structure which is developed on and/or at the first diaphragm surface and from which the second diaphragm surface points away;
    wherein the at least one piezoelectric element is electrically connected to the at least one control and/or evaluation circuit at least via the at least one electrically conductive bond connection structure,
    wherein the at least one electrically conductive bond connection structure is an aluminum-germanium bond connection structure formed on the first diaphragm surface and configured as an interface for eutectic bonding, wherein the eutectic bonding forms a bond frame that surrounds the electrically conductive bond connection structure.

2. The micromechanical component as recited in claim 1, wherein a reinforcement and/or gel-restriction and/or protection structure, which surrounds or spans at least a subregion of the second diaphragm surface, is attached on and/or at the second diaphragm surface of the diaphragm element.

3. The micromechanical component as recited in claim 1, wherein the substrate has at least one through-contact, which extends from an inner surface of the substrate pointing toward the diaphragm element to a countersurface of the substrate pointing away from the inner surface.

4. The micromechanical component as recited in claim 3, wherein the countersurface of the substrate may be soldered to a circuit board.

5. The micromechanical component as recited in claim 1, wherein a maximum distance between the at least one control and/or evaluation circuit and the inner surface of the substrate pointing toward the diaphragm element is smaller than a minimum distance between the at least one control and/or evaluation circuit and the countersurface of the substrate pointing away from the inner surface.

6. The micromechanical component as recited in claim 1, wherein the at least one electrically conductive bond connection structure is a eutectic bonding structure.

7. The micromechanical component as recited in claim 1, wherein the at least one piezoelectric element is positioned on and/or at the first diaphragm surface of the diaphragm element that is attached to a carrier substrate and abuts an etch-stop layer of the carrier substrate, the carrier substrate being partially etched off up to the etch-stop layer.

8. The micromechanical component as recited in claim 7, further comprising a reinforcement and/or gel-restriction and/or protection structure that is fixed in place on and/or at the second diaphragm surface of the diaphragm element, surrounds or spans at least a subregion of the second diaphragm surface, and is structured out of the carrier substrate.

9. The micromechanical component as recited in claim 8, further comprising a housing, wherein the diaphragm element with the attached substrate is positioned in the housing in such a way that a sealing ring which is at least partially situated in a groove at the receiving opening of the housing makes contact with the reinforcement and/or gel-restriction and/or protection structure.

10. The micromechanical component as recited in claim 1, wherein the at least one electrically conductive bond connection structure is a eutectic bonding structure formed out of germanium deposited on and/or at the first diaphragm surface and aluminum deposited on and/or at an inner surface of the substrate.

* * * * *